Aug. 24, 1965
G. E. OLSON
3,202,831
MAGNETIC CORE RING CIRCUIT
Filed June 30, 1959
2 Sheets-Sheet 1
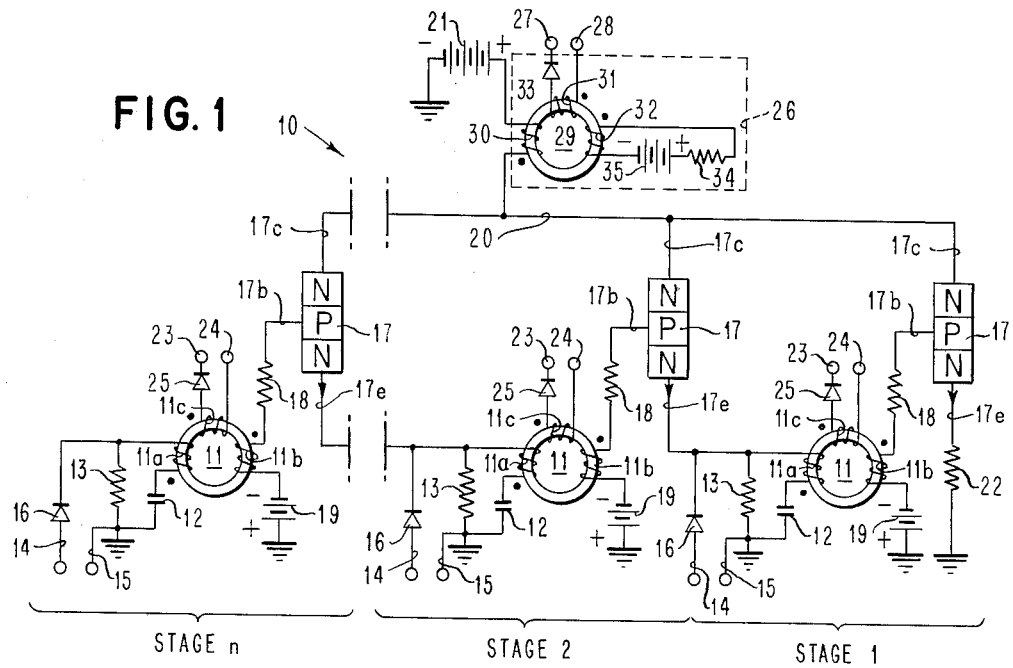
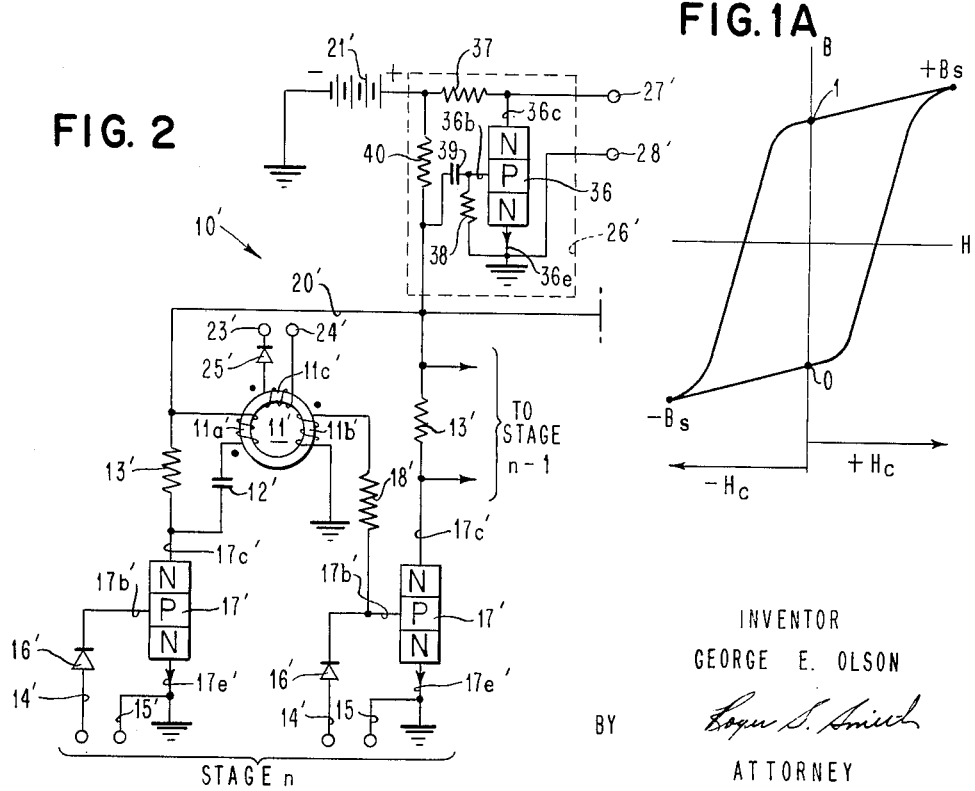
INVENTOR
GEORGE E. OLSON
BY
ATTORNEY Aug. 24, 1965  G. E. OLSON  3,202,831
MAGNETIC CORE RING CIRCUIT
Filed June 30, 1959  2 Sheets-Sheet 2

United States Patent Office 3,202,831
Patented Aug. 24, 1965

3,202,831
MAGNETIC CORE RING CIRCUIT
George E. Olson, Wappingers Falls, N.Y., assignor to International Business Machines Corporation, New York, N.Y., a corporation of New York
Filed June 30, 1959, Ser. No. 824,021
2 Claims. (Cl. 307—88.5)

The present invention relates to electrical circuits employing magnetic cores, and more particularly to magnetic core ring circuits.

Ring circuits are employed in accounting machines and computers for widely varying purposes including timing, commutating, or pulse generation, wherein the ring is designed to produce either a plurality of pulses accurately spaced in time, or a pulse train containing a specific number of pulses. A ring circuit generally comprises a plurality of cascade connected bistable devices which operate sequentially as input pulses are applied. Cores constructed of magnetic material having the property of relatively high residual magnetism are inherently bistable. Because of various advantages they offer over other devices, such as reduced size, mechanical rigidity, etc., cores of this type have found wide usage in ring circuits during recent years.

Standard magnetic core ring circuits employ a plurality of magnetic core shifting circuits one of which is placed in a set or information holding state. Advancing pulses are applied to the shifting circuits to cause the single bit of information to be shifted from stage to stage, or stepped through the ring. Each advancing step must be initiated by a separate advance pulse; thus a multiple pulse generating device such as a multivibrator or the equivalent is required to operate the ring.

It is a primary object of the present invention to provide a self advancing ring circuit which requires but a single starting pulse for operation.

Another object of the invention is to provide such a self advancing ring circuit employing magnetic cores.

A further object of the invention is to provide a ring circuit which is stable in operation.

Still another object of the invention is to provide a ring circuit which is readily adaptable as a pulse generator, counter, or signal converter.

An additional object of the invention is the provision of a novel magnetic core ring circuit which can operate reliably at high speeds.

Another object of the invention is to provide a ring circuit comprising a series of electrical circuits cooperating in a novel manner.

A still further object of the invention is to provide a self advancing magnetic core ring circuit the commencement of operation of which may be controlled independently of the conditioning of the stage thereof by application of an input pulse.

An additional object of the invention is to provide a circuit of the character described which includes novel feedback arrangements for increasing the speed and standardizing the operation thereof.

A feature of the invention is an improved magnetic core circuit which is responsive to an input pulse applied thereto to provide a powered output pulse after a predetermined time delay and to return itself to its initial or reset condition. A plurality of circuits of this character connected in cascade provide the ring having the advantage that it does not require a separate pulse for each advancing step, but which will step itself through a complete cycle of operation in response to a single starting pulse.

The present invention comprises a ring including a plurality of stage circuits each of which includes as principal components, a magnetic core and a switching or signal translating device such as a transistor. Input circuit means are provided in each stage circuit for altering the state of the core in response to input pulses applied thereto. The input circuit means is operable, in response to application of a single input pulse, to switch the core from an initial stable magnetic state to the opposite state and then back to the initial state again. Each time the core switches from one of said states to the other a voltage is induced in an output winding coupled to the core. The voltage induced when the core is switched from the opposite state to the initial state is utilized to actuate the switching or translating device to produce therefrom an amplified or powered output pulse. This powered output pulse is delivered to the next stage circuit of the ring to provide an input for actuating that stage. A single input pulse applied from an external source to any stage circuit thus causes sequential actuation of that stage and each succeeding stage of the ring.

The foregoing and other objects, features, and advantages of the invention will be apparent from the following more particular description of preferred embodiments of the invention, as illustrated in the accompanying drawings:

In the drawings:

FIGURE 1 is a circuit diagram illustrating a self advancing ring circuit embodying the present invention;

FIGURE 1A illustrates the typical hysteresis loop of a magnetic core suitable for use with the present invention.

FIGURE 2 is a circuit diagram of a single self advancing ring stage circuit illustrating a modified form of invention;

Figure 3:
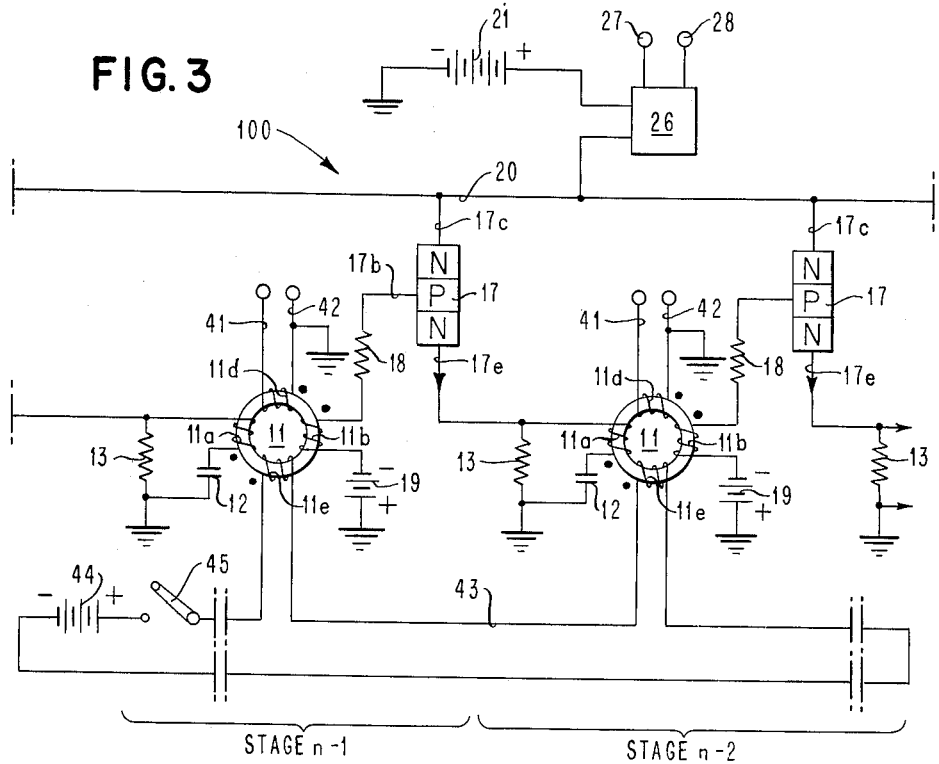
FIGURE 3 illustrates an embodiment of the invention wherein means are provided for controlling the commencement of operation of the ring independently of the application of an input pulse to one of the stage circuits.

The magnetic cores employed as principal components of the present invention are of the type which exhibit hysteresis loop characteristics similar to those shown in FIGURE 1A. Cores of this type are commonly referred to as bistable elements for the reason that they have two distinctly different stable states of magnetic remanence. These states are identified in the hysteresis loop of FIGURE 1A by the numerals 1 and 0, in accordance with customary binary terminology. Hereinafter, they will be referred to as the "1 state" and the "0 state." For purposes of the following description the 0 state is considered as the reset or cleared state. It will be understood, of course, that this is a purely arbitrary choice and that either state might be so considered.

The magnetic state of a bistable core may be altered at will by application of a magnetic force applied thereto by means of an electric current carrying winding coupled to the core. The magnetic force may exist in either of two opposite directions, as shown by the vectors $+H_c$ and $-H_c$ in FIGURE 1A. A force having the sense and magnitude of $+H_c$ will drive the core to a positive saturation condition $+B_s$ and a force having the sense and magnitude of $-H_c$ will drive the core to a negative saturation condition $-B_s$. The core will remain in saturated condition only so long as the force exists, however, and when the force is removed the core will traverse its hysteresis loop to the nearest remanence state; the 1 state if driven to $+B_s$ or the 0 state if driven to $-B_s$. In describing alterations of the state of a core it is convenient to ignore the excursions to the points $+B_s$ and $-B_s$ and simply state that an applied force drives the core to one of its remanence states.

It will be observed that throughout the drawings each of the several windings associated with the magnetic cores is provided with a black dot adjacent one end. The dots serve to indicate the sense of the windings. According to the notation adopted herein, current flowing into the dotted end of a winding will drive the associated core from the 1 state to the 0 state. Current flowing into the undotted end of a winding will drive the associated core from the 0 state to the 1 state. The dots also indicate the polarity of voltage induced in a winding by a flux change in the core coupled therewith. When a core traverses its hysteresis loop from the 0 state to the 1 state, the voltage induced in windings coupled thereto will be negative at the dotted ends. When a core traverses its hysteresis loop from the 1 state to the 0 state, the induced voltage will be positive at the dotted end of the associated windings.

FIGURE 1

Referring now in detail to the drawings, and to FIGURE 1 in particular, applicant's invention is shown as embodied in a ring circuit 10 which comprises a plurality of cascaded stage circuits, identified from right to left as stage 1, stage 2, . . . stage n. Each stage circuit is identical to the others, and it is believed that a description of one will suffice for all. The corresponding components of the several stage circuits have accordingly been assigned identical reference numerals.

Each stage circuit includes a magnetic core 11 of the type hereinbefore described, to which are coupled three windings, an input or primary winding 11a, and two output or secondary windings 11b and 11c. The input winding 11a is connected to an input circuit which includes a capacitor 12 connected in series with the winding 11a, and a resistor 13 connected in shunt across the series combination of winding 11a and capacitor 12. This input circuit is provided with a pair of stage input lines 14 and 15 which connect to the upper and lower ends of the resistor 13, respectively. A diode or other unidirectional conducting device 16 is interposed in the line 14. The diode 16 is poled to pass current into the undotted end of winding 11a.

A switching or signal translating device such as the transistor 17 is also included in each stage circuit. The transistors shown in FIGURE 1 and throughout the drawings are of the NPN junction type having bases 17b, collectors 17c and emitters 17e. It will be understood that other types of transistors may be used to provide the switching and amplifying function. The base 17b of transistor 17 is connected through a suitable limiting resistor 18, to the dotted end of winding 11b of the core 11. The opposite end of winding 11b is connected to the negative terminal of a bias voltage source 19. The voltage of the source 19 is relatively low, for example in the range of 0.5 volt to 1.0 volt, but it is sufficient to maintain the base 17b of transistor 17 slightly negative in the absence of any substantial induced voltage in winding 11b, and thereby hold the transistor in a normally cut-off or nonconductive state.

The collector 17c of the transistor 17 of each stage circuit is connected to a common voltage supply line 20 which, in turn, is connected to the positive terminal of a voltage source 21, common to all stage circuits. The emitter 17e of each transistor is connected, through a load resistor to ground or reference potential. The load resistor in the emitter circuit of the transistor of each stage except stage 1 comprises the input circuit resistor 13 of the following stage, that is, the stage bearing the next lower identifying number. Coupling from one stage to the next is provided in this manner. Stage 1, being the final stage of the ring, is provided with a resistor 22 in the emitter circuit of its transistor 17.

The output winding 11c of the core 11 of each stage circuit is employed to provide an indication of the operation of that stage of the ring. The winding 11c is connected between a pair of stage output terminals 23 and 24. A diode 25 is connected in series with the winding 11c to block induced voltages of one polarity.

The ring circuit 10 also includes a counting or tallying circuit 26 which will produce an indication on output terminals 27 and 28 each time any one of the stage circuits is operated. In the embodiment of FIGURE 1, the counting circuit 26 comprises a bistable magnetic core 29, having the same general hysteresis loop characteristics as the cores 11, to which are coupled an input winding 30, an output winding 31 and a bias winding 32. The input winding 30 is interposed in the common supply line 20 of the ring 10 with its undotted end nearest the positive terminal of the source 21. The output winding 31 is connected in series with a diode 33 between the output terminals 27 and 28 of the circuit 26. The bias winding 32 is connected in series with a suitable limiting resistor 34 to a bias voltage source 35. The dotted end of the winding 32 is nearest the positive terminal of the source 35.

Operation of FIGURE 1

As briefly described earlier herein, each stage circuit of the ring 10 is operable, upon application of an input pulse, to cause its core 11 to be switched from the reset state to the set state, and then back to the reset state again. The flux reversal occurring when the core is reset is utilized to activate the associated transistor 17 and produce a powered output pulse which may be fed to the next stage to cause operation thereof. The details of this operation will now be described. For the purpose of the following description let it be assumed that all cores 11 are initially in the reset state.

Operation of the ring 10 is commenced by applying an input pulse to the stage input lines 14 and 15 of any selected stage, for example, stage 2. This pulse must be of proper polarity to pass the diode 16 and must be of sufficient magnitude and duration to fully switch the core 11, and in addition to place a substantial charge upon the capacitor 12. Assuming these requirements to be satisfied, the core 11 will reside at the end of the input pulse, in the 1 state and the capacitor 12 will be charged. Substantial voltages will have been induced in the output windings 11b and 11c during the magnetic excursion of the core 11 from the 0 to the 1 state. The voltage in winding 11b is of a polarity negative at the dotted end, however, and merely aids the bias source 19 to hold the transistor 17 of stage 2 cut off. The voltage induced in winding 11c may or may not have produced an output at terminals 23 and 24, depending upon the polarity of the diode 25. With the diode 25 connected as shown, the voltage on winding 11c would be blocked.

Upon termination of the input pulse, capacitor 12 will commence to discharge the energy stored therein through the closed circuit loop formed by the resistor 13 and the winding 11a. This discharge will cause current flow through the winding 11a from the dotted end to the undotted end, developing a force tending to switch the core back to the 0 state. If the circuit parameters are properly selected, this current will be of sufficient amplitude and duration to fully reset the core 11. As the core commences to traverse its hysteresis loop from the 1 state to the 0 state, voltages will again be induced in the windings 11b and 11c, but of polarity opposite to those induced during the preceding magnetic excursion. The voltage induced in the winding 11c will forward bias the diode 25 and produce an output at terminals 23 and 24 to indicate operation of stage 2. The voltage induced in winding 11b, being positive at the dotted end of the winding, will overcome the small negative bias and apply a positive signal to the base 17b of transistor 17, rendering it conductive. The transistor 17 will only conduct during the time the core 11 is switching and when the core has been fully reset the voltage in winding 11b will disappear and the bias voltage source 19 will cut the transistor off.

During the time transistor 17 of stage 2 is in the conductive state, current will flow from the source 21, through the common line 20, and through the collector and emitter circuits of transistor 17 to ground. Since the input circuit of stage 1 forms the load in the emitter circuit of transistor 17 of stage 2, activation of the transistor will produce a powered input pulse to the input circuit of stage 1, causing stage 1 to operate in the manner just described with respect to stage 2. The application of a single input or triggering pulse to stage 2 thus causes stages 2 and 1 to operate in sequence. If an additional stage followed stage 1, the operation of stage 1 would result in the application of an input pulse to the additional stage, causing it to operate also. Had the input or triggering pulse been applied to the input lines 14 and 15 of stage $n$ of the ring, all $n$ stages would have operated in sequence.

The counting or tallying circuit 26 connected in the line 20 of the ring 10 operates to produce an output pulse at terminals 27 and 28 each time a stage of the ring is operated. It will be observed that the input winding 30 of the core 29 is connected directly in the supply line 20. Current flowing in this line in response to activation of any of the transistors 17 thus flows through the winding 30 in a direction to develop a force tending to switch the core 29 to the 1 state. The voltage source 35, on the other hand, causes a steady current flow in the bias winding 32 in a direction to develop a force tending to switch the core 29 to the 0 state. The parameters of the circuit 26 are adjusted so that the force developed in winding 30 is sufficient to overcome the bias force and switch the core 29 to the 1 state whenever current flows in line 20. As soon as current flow in line 20 ceases, however, the constant force in the bias winding 32 returns the core 29 to the 0 state. The core 29 is thus switched and reset each time one of the stage circuits operates. The output winding 31 experiences an induced voltage during each setting and resetting operation. The voltages induced in winding 31 during the setting operations forward bias diode 33 and produce outputs at terminals 27 and 28.

It will be apparent from the foregoing that the several cascaded stage circuits which make up the ring 10 are operable, in response to application of a single triggering pulse to one of their number, to operate in sequence, advancing the ring from the point where the triggering pulse is applied to the end. Each operated stage produces an output at the stage output terminals 23 and 24 thereof, and a pulse train containing one pulse for each operated stage is produced at terminals 27 and 28 of the counting circuit 26.

When each stage of the ring has been operated it is returned to the reset condition, ready for additional operation without further manipulation.

The outputs obtained from the ring are suited for several uses. The stage outputs, appearing at timed intervals may be employed, for example, as clock pulses to control various utilization devices. The output from the counting circuit 26 may be applied to any utilization device requiring a series of activating pulses. Since the number of pulses obtained from the counting circuit depends upon the point in the ring 10 at which the triggering pulse is applied, any desired number of outputs from one to $n$ may be obtained. To obtain a specific number of pulses, a single triggering pulse may be applied to the stage circuit bearing the corresponding identification number. The ring 10 is therefore useable to convert digit values to pulse trains representative thereof.

FIGURE 2

FIGURE 2 illustrates an embodiment of the invention which includes modifications of both the stage circuits and the counting circuit.

The principal components of the stage circuit of FIGURE 2 are identical to those shown in FIGURE 1, and similar reference numerals, differing only in that they are primed ('), are applied thereto. The principal difference between the stage circuit of FIGURE 2 and those of FIGURE 1 is that the load in the output circuit of the transistor 17' is connected in the collector circuit rather than the emitter circuit as in FIGURE 1. The input circuit resistor 13' of each stage circuit is, accordingly, connected in series with the collector 17c' of the transistor 17' of the preceding stage, and the emitter 17e' of each transistor is connected directly to the reference potential. The stage input lines 14' and 15' of each stage are not connected to the opposite ends of the input circuit resistor 13', in this embodiment, but are connected to the base 17b' and emitter 17e' of the transistor 17' of the preceding stage. With this arrangement input or triggering signals of a level suitable for activating a transistor may be employed.

With the circuit connections just described, a cycle of operation of the ring 10' commencing at a selected stage is initiated by applying an input signal to the transistor 17' of the preceding stage. The activation of that transistor 17' provides a powered input to the desired stage circuit. The operation of each stage circuit is identical to that described with reference to FIGURE 1. It will be observed, with regard to FIGURE 2, that since operation of a particular stage is initiated by activating the transistor 17' of the preceding stage, the counting circuit 26' will provide one more output pulse than the number produced by the stage output means. This is true because the stage outputs are produced in response to changes of stage of the core 11' of the associated stage circuit, while the outputs of the counting circuit are in response only to operation of the transistor 17' of the stage circuits.

An additional difference between the stage circuit shown in FIGURE 2 and those of FIGURE 1 is that the output winding 11b' of each stage circuit is connected directly between the base 17b' and emitter 17c' of the associated transistor 17'. It has been found that with proper selection of circuit parameters, this arrangement is sufficient without the use of a bias source, to maintain the transistor 17' nonconductive except when voltage of proper polarity is induced in winding 11b'.

Also shown in FIGURE 2 is a modified counting circuit, identified by the numeral 26'. The counting circuit 26' employs a transistor 36 to produce outputs upon operation of the stage circuits, rather than the core 29 shown in FIGURE 1. As illustrated in FIGURE 2, the transistor 36 is connected, in series with a load resistor 37, between the positive terminal of the source 21' and the reference potential. The output terminals 27' and 28' are connected to the collector 36c and emitter 36e, respectively. The base 36b is connected through a resistor 38 to reference potential so that the transistor is normally maintained in a non-conductive state.

It is intended that the transistor 36 be activiated each time a stage circuit is operated. A coupling condenser 39 is provided to connect the base 36b to the line 20' to accomplish this result. The condenser 39 is connected to the lower end of a resistor 40 inserted in the line 20'. Each time a pulse of current flows in the line 20', a temporary voltage drop occurs across the resistor 40, causing first a negative voltage shift and next a positive voltage shift at the adjacent terminal of the condenser 39. The positive voltage shift causes the transistor 36 to be temporarily rendered conductive, thereby producing a negative pulse at the terminals 27' and 28'.

The embodiment of the invention shown in FIGURE 2 operates in substantially the same manner as that of FIGURE 1, and produces identical results. The several modifications shown in FIGURE 2 are intended to be taken as exemplary of the changes in form and structure which may be made without departing from the spirit of the invention. It should also be understood that the several modifications shown in FIGURE 2 are not interdependent. They are shown in combination only for the sake of convenience.

It will be understood that the circuit 26' is but one of many embodiments which may be employed with the improved self advancing ring circuit disclosed herein without departing from the spirit of the invention. Any signal producing arrangement responsive to operation of each stage circuit, for example a multi-input logical OR circuit, would be sufficient.

FIGURE 3

FIGURE 3 of the drawings illustrates a plurality of stage circuits connected in cascade to form a ring 100 the advancement of which may be controlled independently of the application of an input pulse thereto. In this embodiment of the invention means are provided for conditioning or presetting a selected stage upon application of an input pulse without initiating a cycle of operation. Separate control means are provided for initiating the advancing cycle.

Except for the stage input and anvancement control means now to be described, the stage circuits shown in FIGURE 3 are identical to those of FIGURE 1. The major components thereof have accordingly been assigned the reference numeral used in FIGURE 1. The manner of operation of the ring 100, once initiated, is the same as that described with reference to FIGURE 1, that is to say, once a core 11 has been set and reset to cause operation of its associated transistor 17, each following stage of the ring will be operated in sequence in the manner heretofor described.

In order to condition or preset a stage circuit upon application of a triggering pulse without initiating an advancing cycle, an additional input winding 11d is coupled to the core 11 of each stage circuit. The winding 11d is coupled to stage input lines 41 and 42 with its dotted end adjacent line 42. With this arrangement application of an input pulse, positive with respect to reference potential and of sufficient magnitude and duration to switch a core, to the lines 41 and 42 of a stage circuit will switch the core 11 thereof from the 0 state to the 1 state. Since this magnetic excursion of the core 11 does not cause activation of the associated transistor 17, the selected stage is conditioned or preset without initiating an advancement cycle.

Once a stage circuit has been conditioned in the manner described, it may be triggered into operation by resetting the core 11. A winding 11e is provided on the core 11 of each stage of the ring 100 for this purpose. The several windings 11e are connected in a single series circuit 43 connected to a voltage source 44. Control means 45, shown as a switch in FIGURE 3, is provided to control energization of the circuit 43. When the control switch 45 is closed, current will flow through each of the windings 11e from the dotted end to the undotted end, developing in each core 11, a force tending to switch the core to the 0 state. The particular core 11 which has previously been preset by an input pulse will experience a flux reversal, providing an output to activate its associated transistor 17 and thereby initiate a cycle of operation.

The arrangement just described provides a means for storing input pulses which may occur at times other than those when it is desired to operate the ring 100. The ring 100 is capable of accepting an input pulse at any time and storing the information represented thereby until it is called out by actuation of the circuit 43.

It will be noted that no stage output means are provided in the embodiment shown in FIGURE 3. These means have been omitted solely for the sake of clarity, and may be provided as shown at 11c, 23, 24, and 25 in FIGURE 1.

FIGURE 4

Figure 4:
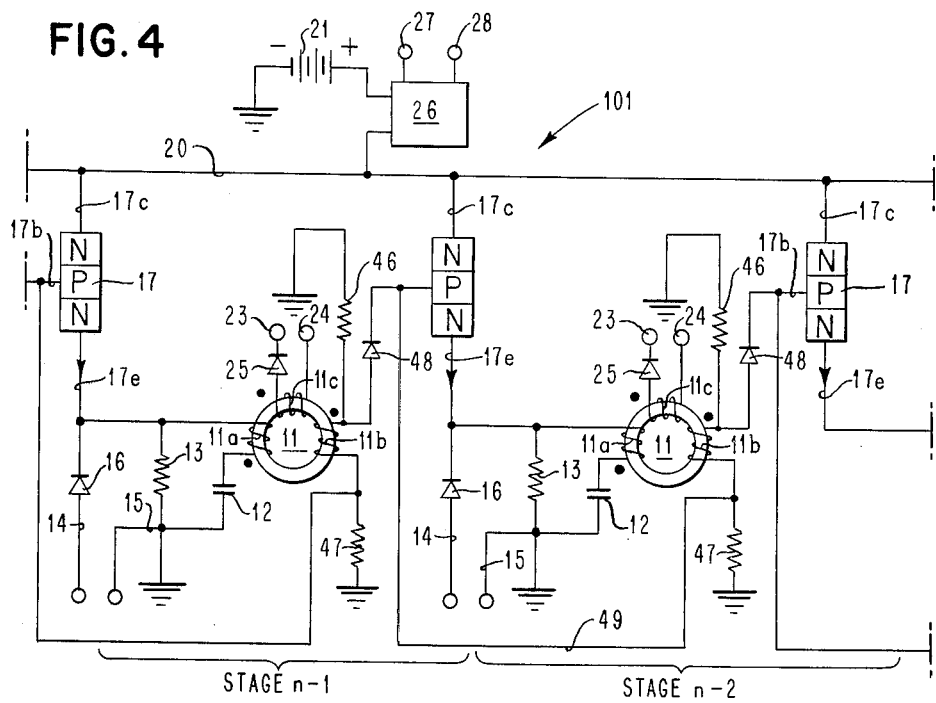
FIGURE 4 illustrates an embodiment of the invention wherein novel regeneration means are provided to increase the speed of operation of the ring.

In FIGURE 4 of the drawings, there is shown an embodiment of the invention wherein novel regeneration means are provided to increase the speed and insure uniformity of operation of the stage circuits.

It will be recalled that with the arrangement shown in FIGURE 1, operation of a stage circuit is initiated by applying an input pulse to the winding 11a of the stage circuit, either through the stage input lines 14 and 15 or by activation of the transistor 17 of the preceding stage. The input pulse switches the core 11 to the 1 state and charges the capacitor 12, which subsequently discharges to return the core 11 to the 0 state. The speed of operation of the activated stage circuit is dependent, in part, upon the characteristics of the input pulse. If the input pulse has a fairly long rise time, the core 11 will be switched more slowly than if the rise time is short. If the fall time of the input pulse is long, the discharge of capacitor 12 will be affected and the core 11 will be reset more slowly than if the fall time is short.

By means of the regeneration arrangement shown in FIGURE 4, the transistor 17 of each stage circuit is caused to saturate rapidly when activated and to cut off sharply when its operation is completed. The pulse produced by each transistor 17 is thereby made to have short rise and fall times, and to be substantially uniform with pulses produced by all other transistors 17. Enhancement of speed and uniformity of operation is thus achieved.

The ring of FIGURE 4, identified by the numeral 101, comprises a plurality of cascaded stage circuits generally similar to those shown in FIGURE 1. The stage circuits employ magnetic cores 11, having input windings 11a and input circuit means including capacitors 12 and resistors 13 in the same manner as in FIGURE 1. The stage circuits also employ transistors 17, the collector and emitter circuits of which are connected in the same manner as in FIGURE 1. The ring 101 further employs a power source 21 and supply line 20 together with the counting or tallying circuit 26, all in the same arrangement as shown in FIGURE 1.

The difference between the ring 101 and the ring 10 of FIGURE 1 is in the means for controlling the operation of the transistors 17 in response to voltages induced in the output windings 11b of the cores 11. As shown in FIGURE 4, the output winding 11b of each core 11 is connected in series between two resistors 46 and 47, one end each of which is tied to reference potential. The dotted end of each winding 11b is also connected through a diode 48 to the base 17b of its associated transistor 17. The undotted end of each winding 11b is connected by a regenerative feedback line 49 to the base 17b of the transistor 17 of the preceding stage circuit.

Operation of the circuit to provide the regeneration effect is as follows: Assume that the transistor 17 of stage $n$ (shown at the extreme left in FIGURE 4) has been rendered conductive to apply an input to core 11 of stage $n-1$. As soon as the input current flowing in winding 11a reaches a value which will cause core 11 to begin the magnetic excursion from the 0 state to the 1 state, a voltage positive at the undotted end will be induced in winding 11b. Because of the circuit arrangement including resistors 46 and 47, this voltage will raise the undotted end of winding 11b to a value positive with respect to the reference potential. Feedback winding 49 will apply this positive potential to the base 17b of the transistor 17 of stage $n$ to increase its conductivity and thereby increase the current applied to input winding 11a of the activated core 11. A regenerative action is thus established to cause rapid saturation of the transistor 17.

After the core 11 has been fully switched to the 1 state, and the capacitor 12 in its input circuit has commenced to discharge to return it to the 0 state, a voltage of polarity positive at the dotted end is induced in winding 11b coupled to the activated core 11. Because of the arrangement of the resistors 46 and 47, this voltage brings the undotted end of winding 11b to a potential negative with respect to the reference potential, thereby applying a negative voltage to the base of the transistor 17 of stage $n$ through feedback winding 49, to cause the transistor to be cut off sharply and thereby permit more efficient switching of the core 11 by action of the capacitor 12 in its input circuit. The voltage induced during the excursion of the core 11 from the 1 state to the 0 state also applies a positive potential to the base 17b of the transistor 17 of stage n—1 to provide the powered output pulse from stage n—1 in the manner hereinbefore described. This output pulse is delivered to winding 11a of stage n—2 to initiate operation of that stage. The resistor network 46, 47, and feedback winding 49 of that stage then operate to control transistor 17 of stage n—1 in the manner just described. The total effect is to provide increased speed of operation and more uniform time delays throughout the entire ring 101.

It will be observed that the regenerative effect is achieved by making use of the voltages induced in winding 11b during both changes of state of the associated core 11, thus putting the winding 11b to dual usage. In standard magnetic core circuits, and in the novel circuits shown in FIGURES 1 to 3 as well, only one of said voltages is normally employed for a useful purpose.

While the invention has been particularly shown and described with reference to preferred embodiments thereof, it will be understood by those skilled in the art that various changes in form and details may be made therein without departing from the spirit and scope of the invention.

What is claimed is:

1. A self advancing ring circuit comprising a plurality of stages each of which includes a magnetic element having first and second states of magnetic stability, input circuit means including the series connection of an input winding and a capacitor coupled to said element and responsive to an input pulse applied thereto to cause the element to first assume its first magnetic state and to next assume its second magnetic state, an output winding magnetically coupled to said element wherein voltages are induced upon changes of the element from one state to the other, and a switching device coupled to the output winding of the element and responsive to the voltage induced in said output winding during changes of the element from its first stable state to its second stable state for producing an output pulse, means coupling the switching device in each stage except the last to the input circuit means of the next succeeding stage so that the output pulse from each stage is applied as the input pulse to the next succeeding stage.

2. A self advancing ring circuit comprising a plurality of stages each of which includes a magnetic element having first and second states of magnetic stability, input circuit means including the series connection of an input winding and a capacitor coupled to said element and responsive to an input pulse applied thereto to cause the element to first assume its first magnetic state and to next assume its second magnetic state, an output winding magnetically coupled to said element wherein voltages are induced upon changes of the element from one state to the other, and a switching device coupled to the output winding of the element and responsive to the voltage induced in said output winding during changes of the element from its first stable state to its second stable state for producing an output pulse, means coupling the switching device in each stage except the last to the input circuit means of the next succeeding stage so that the output pulse from each stage is applied as the input pulse to the next succeeding stage and signal means coupled to each stage of said ring for producing a signal corresponding to each activation of a stage of said ring.

References Cited by the Examiner

UNITED STATES PATENTS

| | | | |
|---|---|---|---|
| 2,713,675 | 7/55 | Schmitt | 340—174 |
| 2,734,184 | 2/56 | Rajchman | 340—174 |
| 2,749,451 | 6/56 | Talambiras | 340—174 |
| 2,832,062 | 4/58 | Tracy | 340—174 |
| 2,891,170 | 6/59 | Paull | 307—88.5 |
| 2,899,570 | 8/59 | Johannesen et al. | 307—88.5 |
| 2,902,609 | 9/59 | Ostroff | 307—88.5 |
| 2,920,213 | 1/60 | Elias | 307—88 |
| 2,950,398 | 8/60 | Johnson | 307—88.5 |
| 2,991,457 | 7/61 | Hoffman et al. | 307—88.5 |
| 3,063,038 | 11/62 | Davis et al. | |
| 3,102,239 | 8/63 | Chen et al. | |

ARTHUR GAUSS, *Primary Examiner.*

GEORGE N. WESTBY, *Examiner.*